United States Patent [19]

Kern

[11] Patent Number: 4,961,702
[45] Date of Patent: Oct. 9, 1990

[54] RETAINER FOR INJECTION MOLDS

[75] Inventor: Frederick C. Kern, Rochester Hills, Mich.

[73] Assignee: Fairchild Industries, Inc., Chantilly, Va.

[21] Appl. No.: 313,196

[22] Filed: Feb. 21, 1989

[51] Int. Cl.⁵ .............................................. B29C 45/66
[52] U.S. Cl. ................................. 425/595; 269/157; 269/254 CS; 425/DIG. 221
[58] Field of Search .................. 280/435, 507, 508; 425/595, DIG. 221; 269/157, 254 CS

[56] References Cited

U.S. PATENT DOCUMENTS

| | | | |
|---|---|---|---|
| 482,546 | 9/1882 | Clarke | 280/508 |
| 776,292 | 11/1904 | Buller | 280/508 |
| 844,522 | 2/1907 | Johnson, Sr. | 280/508 |
| 1,240,818 | 9/1917 | Buller | 280/508 |
| 1,335,211 | 3/1920 | Walker | 280/508 |
| 1,641,354 | 9/1927 | Reid | 280/435 |
| 2,096,282 | 10/1937 | Kortering | 280/435 |
| 2,458,848 | 1/1949 | Goff | 280/508 |
| 2,491,373 | 12/1949 | Goff | 280/508 |
| 3,811,645 | 5/1974 | Feist | 249/68 |
| 4,162,886 | 7/1979 | Holland et al. | 425/556 |
| 4,403,810 | 9/1983 | Bieneck | 425/595 |
| 4,515,342 | 5/1985 | Boskovic | 249/122 |
| 4,765,585 | 8/1988 | Wieder | 249/68 |

*Primary Examiner*—Jay H. Woo
*Assistant Examiner*—C. Scott Bushey
*Attorney, Agent, or Firm*—Michael W. York

[57] ABSTRACT

A retainer for use in connection with injection molding that is used to retain a slide in its open position when the mold is opening. The retainer has two pivotally connected jaw members and a coiled compression spring that applies spring pressure to the jaw members as these members engage a pin that is connected to a slide when the mold is opening. The construction of the jaw members avoids undesired spreading when the pin engages the jaw members and the jaw members are constructed in a manner that enables the retainer to be easily assembled. The retainer jaw members completely surround the coil spring and protect it from dirt and only a portion of the ends of the coil spring exert a force upon the jaw members when the retainer is in use.

15 Claims, 2 Drawing Sheets

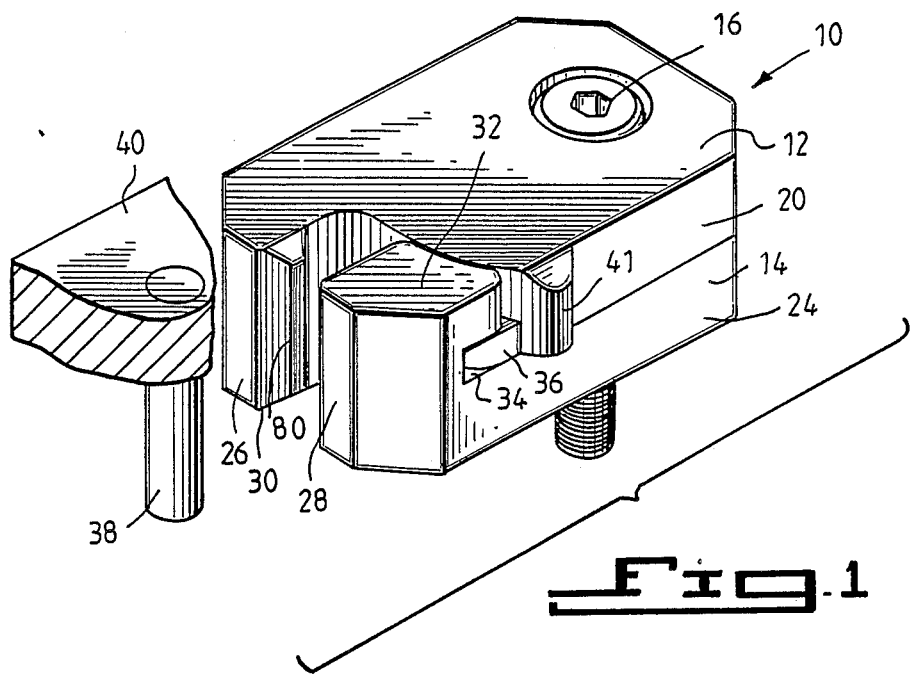
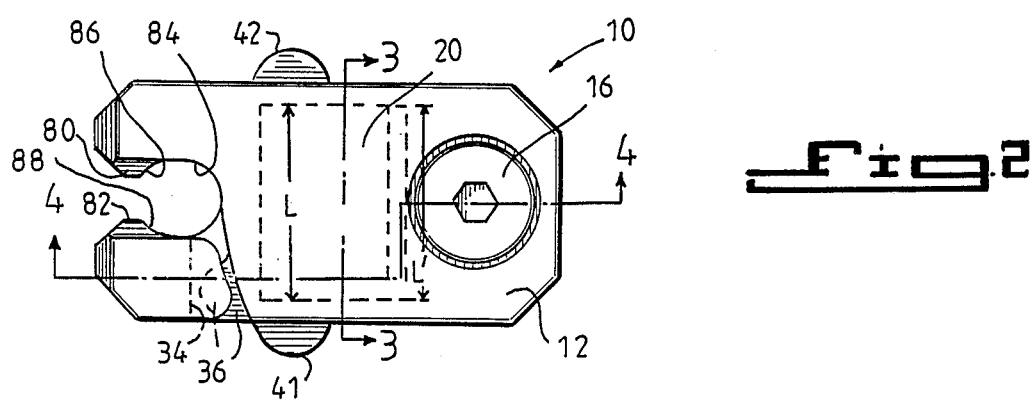
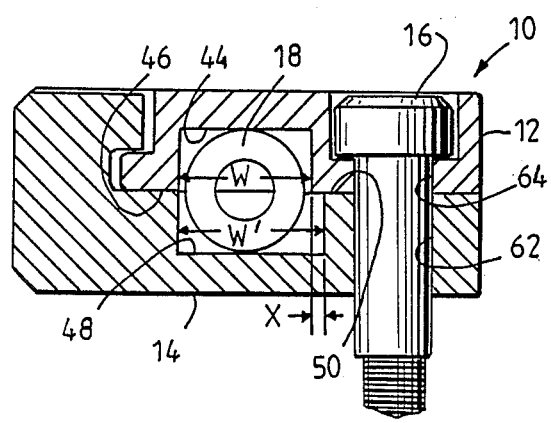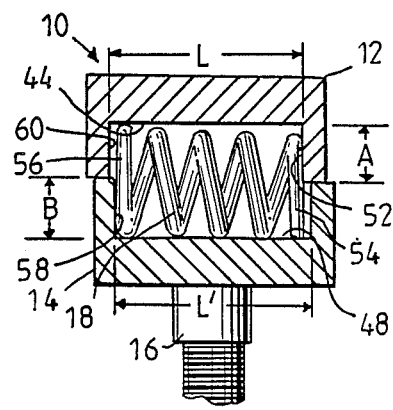

RETAINER FOR INJECTION MOLDS

BACKGROUND OF THE INVENTION

In molds for injection molding of plastic articles, in addition to the typical mating mold parts, laterally moving slides are commonly used to move one or more core parts as the mold is opened and closed. When such a slide is employed the mold uses angle pins, sometimes known as horn pins, which are fixed at an angle to one of the mold parts and pass through a corresponding angular bore in the slide. When the mold is opened, the angle of the angle pin moves the slide laterally away from the part to remove the core element from the molded piece so that the molded piece can be ejected from the mold. This procedure is then reversed and the angle pin moves the slide to position the core element for molding of the next plastic article.

In using such molds, it is important that the slide be held in place when the mold is opening since usually the mold parts are separated sufficiently so that the angle pin is completely withdrawn from its corresponding angular bore in the slide. If the slide is not held by some other means, after the mold parts are fully separated, the slide can inadvertently become displaced, inhibiting closing of the mold without manual realignment of the slide and possibly causing damage to the mold or slide. Although the slides must be firmly and accurately held in the open position, the slides must also release readily when the angle pins reengage the angular inclined bores in the slides to move the core parts laterally together until the mold is again closed.

A number of devices have been used in the past to hold slides in their open position. Such devices are set forth in U.S. Pat. Nos. 3,811,645; 4,515,342 and 4,765,585. In U.S. Pat. No. 3,811,645 two types of slide retainers are disclosed. One is a cumbersome retainer identified as prior art that is attached to the mold and extends outwardly from the mold body and the other is an internal slide retainer with a pin that is attached to the slide. U.S. Pat. No. 4,515,342 discloses slide retainers that use a resilient arm that has a laterally projecting portion that engages the slide or an attachment to the slide. U.S. Pat. No. 4,765,585 discloses a spring loaded plunger with a projecting V-shaped head portion that engages the slide.

Unfortunately, these previous slide retainers are not entirely satisfactory. The slide retainers disclosed in U.S. Pat. Nos. 4,515,842 and 4,765,585 can be adversely affected by wear and by the tolerences in the mold apparatus. These devices also may not positively engage the slide and hence are to at least some extent unreliable. The prior art device in U.S. Pat. No. 3,811,645 takes up a lot of space and depending on required travel extends from the mold where it could interfere with the molding machine. Pressure is also exerted to the sliding parts during the entire movement of the slide retainer which is undesireable. The internal slide retainer set forth in U.S. Pat. No. 3,811,645 is a definite improvement over this prior art retainer and it also is more positive and reliable than the slide retainers in U.S. Pat. Nos. 4,515,842 and 4,765,585. However, the slide retainer set forth in this patent still has disadvantages. These disadvantages include the fact that jaws of the slide retainer are under a certain degree of spring force even when the slide retainer is not in use and the spring is also exposed to dirt and the like when the slide retainer is in use.

The novel retainer invention overcomes these problems associated with previous slide retainers. This retainer invention is positive in its action and is effective to secure a slide in its open position. With this invention the retainer has provision for surrounding all portions of its spring to keep it free from dirt, debris and the like. The retainer has provisions for making it easy to assemble and the jaws of the retainer are only under spring force when the retainer is in actual use to engage a pin that is in turn connected to a slide in the mold.

SUMMARY OF THE INVENTION

The invention relates to slide retainers and the like for use with injection molds and more particularly to slide retainers that are capable of being used inside the mold.

It is an object of the invention to provide a retainer that positively secures a slide in its open position.

It is an object of the invention to provide a retainer that is simple in operation.

It is an object of the invention to provide a retainer that requires no projections or the like external to the mold.

It is also an object of the invention to provide a retainer that is easy to assemble.

It is also an object of the invention to provide a retainer that is easy to install.

It is an object of the invention to provide a retainer having a simplified construction which is easy to manufacture.

It is an object of the invention to provide a retainer having two jaw numbers and a spring in which the spring exerts no forces against the jaw members until the retainer is actually used to grasp a pin member.

It is an object of the invention to provide a retainer which uses a spring that has provision for protecting the spring from dirt, debris and the like that might interfere with its operation.

It is also an object of the invention to provide a retainer which uses a spring that has provisions for surrounding and protecting the spring.

It is an object of the invention to provide a retainer having two jaw members which have provisions for preventing the jaw members from being subjected to undesired separation when the retainer is in use.

It is also an object of the invention to provide a retainer which uses a coil spring in which only a portion of the end of the coil spring is used to exert an operational force for the retainer.

These and other objects are accomplished through the present retainer invention that includes two pivotally joined jaw members and a spring member that acts on the jaw members when the retainer is in use. The retainer is used in conjunction with a pin member which is attached to a slide member in a mold in such a manner that the jaw members engage the pin member as the mold is opened. The jaw members have provisions for engaging each other to prevent them from undergoing undesired separation when the jaw members are in use engaging the pin member. The jaw members substantially completely enclose the spring member to prevent dirt, debris and the like from possibly interfering with the operation of the spring member. The retainer has provisions for enabling it to be easily assembled. The construction of the retainer is such that during operation only a portion of the ends of the spring member exert a force against the jaw members.

BRIEF DESCRIPTION OF THE DRAWINGS

The invention will be hereinafter more fully described with reference to the accompanying drawings in which:

FIG. 1 is a perspective view of the retainer invention located in its in use position associated with a pin member which is connected to a slide in a mold;

FIG. 2 is a top plan view of the retainer illustrated in FIG. 1;

FIG. 3 is a sectional view of the retainer illustrated in FIG. 2 taken substantially on the line 3—3 thereof but shown in a partially activated position;

FIG. 4 is a sectional view of the retainer illustrated in FIG. 2 taken substantially on the line 4—4 thereof;

DETAILED DESCRIPTION OF THE PREFERRED EMBODIMENT

Figure 5:
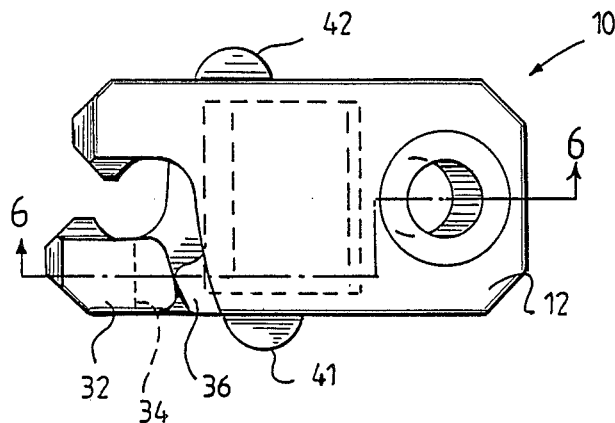
FIG. 5 is a top plan view of the retainer structure illustrated in FIGS. 1 through 4 as it is being assembled.

The retainer invention is illustrated in FIGS. 1 through 6 and is designated generally by the number 10. The retainer 10 comprises an upper jaw or jaw plate member 12, a lower jaw or jaw plate member 14 and a hexagon socket head shoulder screw 16 that pivotally joins the upper and lower jaw members 12 and 14 together. As best indicated in FIGS. 3 and 4, the retainer 10 also includes a coiled compression spring 18. Each jaw member 12 and 14 has a flat generally rectangular shaped portion designated by the respective numbers 20 and 24. Integral jaw projections designated respectively 26 and 28 project outwardly from the respective portions 20 and 24 and a portion 30 and 32 of each jaw projection 26 and 28 extends or projects in a direction substantially perpendicular to the plane of the respective generally rectangular portions 20 and 24.

It will be noted that the jaw projection 28 of the lower jaw member 14 has a lateral slot 34 extending through it and the upper jaw member 12 has a complementary projection 36 extending from its generally rectangular shaped portion 20 and the projection 36 is sized and shaped to fit into and slide within the slot 34. The slot 34 and the associated adjacently located projection 36 comprise means for preventing the upper jaw member 12 from moving more than a minimal amount upward or away from the lower jaw member 14 when an object such as the slide dowel pin 38 that is connected to a standard mold slide 40 is forced between inner projecting portions 80 and 82 of the jaw projections 26 and 28. It will also be noted that upper jaw member 12 and the lower jaw member 14 have respective substantially identically shaped projections 41 and 42 extending laterally from their generally rectangular shaped portions 20 and 24. These projections 41 and 42 are located on opposite sides of the retainer 10 and serve to locate the retainer 10 when it is in use by being located adjacent a wall (not shown) in a retainer pocket (not shown) known in the art.

As best illustrated in FIGS. 2, 3, and 4 the upper jaw member 12 has a generally rectangular shaped recess 44 located in the undersurface 46 of its portion 20 and in a similar manner the lower jaw member 14 has a generally rectangular shaped recess 48 located in the upper surface 50 of its portion 24. As indicated in FIGS. 3 and 4, these recesses 44 and 48 enclose and house the spring 18 in a unique novel manner. This uniqueness is best illustrated in FIG. 3 which shows a cross section of the retainer 10 when the pin 38 illustated in FIG. 1 is entering the jaw portions 26 and 28 and the spring 18 is being compressed.

As illustrated in FIG. 3, the wall portion 52 of the recess 44 in the upper jaw member 12 located adjacent the spring 18 end portion 54 only presses against and exerts a force against a portion of the end of the spring portion 54 which is represented by the dimension labeled A which is substantially one-half of the end of the spring end portion 54. In a similar manner, the other end portion of the spring 18 has only a portion B which is substantially one-half of the end portion 56 contacted by and pressed against by the adjacent wall portion 58 of the recess 48 of the lower jaw member 14. It will be noted that the contacted area B is located on the opposite half portion of the spring end 58 than the contacted area A of the half portion of the spring end 54. In the preferred embodiment the area represented by the letter B is substantially equal to the area represented by the letter A. This use of only a portion of the ends of the spring end portions 54 and 56 reduces the complexity of the construction of the upper and lower jaw members 12 and 14 and makes the retainer 10 easy to manufacture and assemble.

Another important feature associated with the recesses 44 and 48 of the respective upper and lower jaw members 12 and 14 is illustrated in FIGS. 2 and 3. As illustrated in FIGS. 2 and 3, the length L of the rectangular recess 44 in the upper jaw member 12 is less than the length L= of the recess 48 in the lower jaw member 14. The length L is also such that the spring 18 is slightly under compression when the spring's end portions 54 and 56 fit within the recess 44 so that the spring's end portions 54 and 56 push against the adjacent walls 52 and 60 of the recess 44. This allows the spring 18 to be retained in the recess 44 during assembly in a manner that will be hereinafter described in detail.

An additional important feature of the retainer 10 recesses 44 and 48 is illustrated in FIG. 4. As illustrated in FIG. 4, the width W= of the rectangular recess 48 of the lower jaw member 14 is substantially greater than the width W of the recess 44 of the upper jaw member 12. It will be noted that substantially all of the additional width of the width W= over the width W is achieved by increasing the width of the recess 48 a distance X toward the aperture 62 for the screw 16. This distance X is important for the assembly of the retainer 10.

Figure 6:
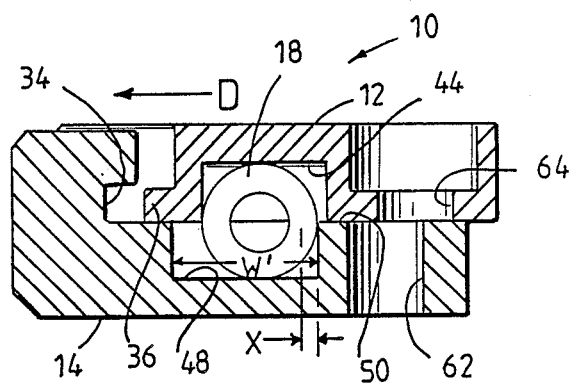
FIG. 6 is a sectional view of the retainer structure illustrated in FIG. 5 taken substantially on the line 6—6 thereof.

FIGS. 5 and 6 illustrate how the retainer 10 is assembled and important features associated with the recesses 44 and 48 of the jaw members 12 and 14 that permit or assist in the assembly of the retainer 10. The first step in the assembly of the retainer 10 is to compress the spring 18 slightly which can be accomplished using vice grips or a similar tool known in the art. The compressed spring 18 is then inserted into the recess 44 in the upper jaw member 12 and then the spring 18 is released so that its spring end portions 54 and 56 press against the respective walls 52 and 60 of the recess 44. In this condition, the spring 18 is retained in place in the recess 44.

Since the length L of the recess 44 is less than the length L= of the recess 48, and since the spring 18 is compressed in and confined in the recess 44, the portion of the spring 18 that extends from the recess 44 can fit and be slid into the recess 48 except that the two recesses 44 and 48 cannot be brought directly together since the projection 36 of the jaw member 12 will interfere with or come into contact with the jaw portion 32 of the jaw member 14. However, the additional distance X of the width W= of the recess 48 in the jaw member 14 allows the spring 18 portion to be inserted into the recess 48 with the projection 36 located away from the jaw portion 32 as illustrated in FIGS. 5 and 6. As indicated in FIG. 6, this would not be possible without the additional distance X of the width W= of the recess 48. Then, the upper jaw member 12 is slid in the direction D along the upper surface 50 of the lower jaw member 14 and the shoulder screw 16 is inserted into the apertures 64 and 62 in the respective jaw members 12 and 14 as illustrated in FIGS. 2 and 4. The assembled retainer can then be used in a conventional manner with the pin 38 shown in FIG. 1 in a manner known to those skilled in the art.

When the retainer 10 is used the pin 38 which may be connected to the slide 40 is forced into the gap between the jaw projections 26 and 28 forcing them outward. As the pin 38 continues to travel in the same direction the jaw projections 26 and 28 close as a result of the spring 18 force that is exerted on the upper and lower jaw members 12 and 14. When the jaw projections 26 and 28 close their respective inner projecting portions 80 and 82 close around the pin 38 as illustrated in FIG. 2 preventing the pin 38 from coming out of the aperture or slot 84 that is formed between the jaw projections 26 and 28. The pin 38 remains in this slot 84 until a force is exerted upon it such as by the slide 40, so that the outward force on the pin 38 causes a force to be exerted on the curved surfaces 86 and 88 of the respective projecting portions 80 and 82 that overcomes the force of the spring that is exerted against the upper and lower jaw members 12 and 14. When this occurs, the projecting portions 80 and 82 move outward and the pin 38 is pulled free from the jaw projections 26 and 28 of the respective upper and lower jaw members 12 and 14. This cycle would then be repeated during the molding as known in the art.

Figure 7:
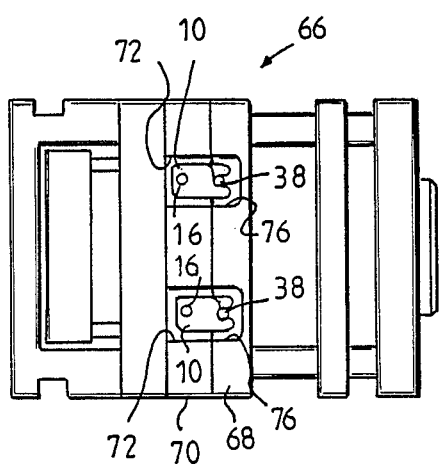
FIG. 7 is a side elevational view of a mold with a floating plate illustrating a different use for the retainer set forth in FIGS. 1 through 6.
Figure 8:
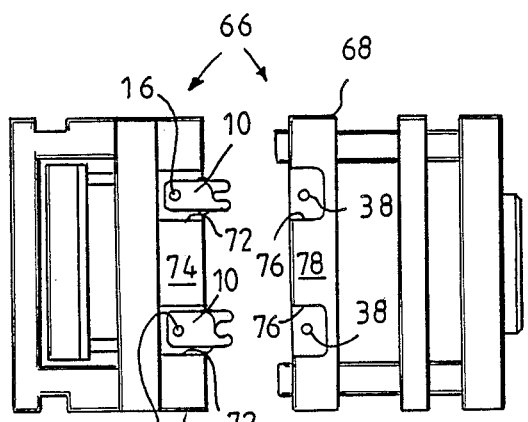
FIG. 8 is a side elevational view of the structure illustrated in FIG. 7 with the mold in its fully open position.

FIGS. 7 and 8 illustrate an additional use for the retainer 10. FIGS. 7 and 8 illustrate a conventional injection mold assembly 66 with a floating plate 68 and a plate 70 that moves with respect to the floating plate 68. As indicated, recesses 72 are made in the side 74 of the plate 70 to accept the retainers 10 that are secured in place in these recesses 72 by screws 16. Other recesses 76 are located in the side 78 of the floating plate 68 and pins 38 are located in these recesses 76 in position to be engaged by the jaw members 12 and 14 of the retainers 10 that are fastened to the plate 70 by the screws 16 as indicated in FIG. 7. These retainers 10 and the pins 38 hold the plates 68 and 70 together until a predetermined force is exerted on the retainers 10. When this occurs the retainers 10 release the pins 38 as illustrated in FIG. 8. This permits sequential opening of the mold plates 68 and 70 of the mold assembly 66.

It will be appreciated that blocks (not shown) can be used to replace the need for a recess 72. In this situation, the retainer 10 is located on the surface of the side 74 of the plate 70 and blocks (not shown) are located on the side 74 on both sides of the retainer 10 to serve as a guide for the retainer 10 in the same manner as the recesses 72.

In the preferred embodiment the jaw members 12 and 14 are made by investment casting from 8620 steel and are case hardened to RC 58-62. The shoulder screw 16 is a standard item, but the compression spring 18 which is made from high quality spring steel must have the ends of its end portions 54 and 56 ground to provide flat surfaces.

Although the invention has been described in considerable detail with reference to a certain preferred embodiment, it will be understood that variations or modifications can be made to the invention without departing from the spirit and scope of the invention as defined in the appended claims.

What is claimed is:

1. A retainer for engaging an object comprising a first jaw member, a second jaw member for cooperating with said first jaw member, said jaw members each having an outer object engaging portion for engaging said object, connecting means for pivotally connecting said first jaw member and said second jaw member at a single pivot location and a spring member having two end portions located between the outer object engaging portions of said jaw members and said connecting means with one spring member end portion located with respect to said first jaw member to cause said first jaw member to only press against and exert a force against a portion of the one end portion of said spring member and with the other spring member end portion located with respect to said second jaw member to cause said second jaw member to only press against and exert a force against a portion of the end of the other end portion of said spring member to cause the object engaging portions of said jaw members to exert a force toward each other when said jaw members are in use to engage said object.

2. The retainer of claim 1 wherein the portion of the spring member end portion pressed against by said first jaw member is located in one-half of the end portion of said spring member and wherein the portion of the other spring member end portion pressed against by said second jaw member is located in the opposite half portion of the other end portion of said spring member.

3. The retainer of claim 2 wherein the portion of the spring member end portion pressed against by said first jaw member is substantially equal to the portion of the opposite spring member end portion pressed against by said second jaw member.

4. The retainer of claim 3 wherein the portion of the spring member end portion pressed against by said first jaw member and the portion of the opposite spring member end portion pressed against by said second jaw member comprise substantially one-half of the spring member end portions.

5. The retainer of claim 3 wherein said first jaw member and said second jaw member each have a recess and wherein at least a portion of said spring member is located in said recesses.

6. The retainer of claim 5 wherein said recesses are generally rectangular shaped.

7. The retainer of claim 6 wherein said recesses include means for assisting in assembling said retainer.

8. The retainer of claim 7 wherein said means for assisting in assembling said retainer comprises means for maintaining said spring member under compression during assembly.

9. The retainer of claim 8 wherein the recesses in said jaw members each have a length and wherein said means for maintaining said spring member under compression during assembly comprises one recess with a length that is less than the length of the other recess.

10. The retainer of claim 9 wherein said first and said second jaw members have means for preventing said jaw members from moving away from each other.

11. The retainer of claim 10 wherein said means for preventing said jaw members from moving away from each other comprises a projection located on the outer object engaging portion of one jaw member and a corresponding slot located on the outer object engagaing portion of said other jaw member for slideably receiving said projection.

12. The retainer of claim 11 further comprising additional means for assisting in assembling said retainer associated with said recesses.

13. The retainer of claim 12 wherein the recesses in said jaw members each have a width and wherein said additional means for assisting in assembling said retainer comprises a recess with a width greater than the width of the other recess whereby said spring member can be slideably moved within one recess while being retained within the other during the assembly of said retainer.

14. The retainer of claim 5 further comprising means on said jaw members for locating said retainer adjacent a wall.

15. The retainer of claim 14 wherein said means for locating said retainer adjacent a wall comprises a projection extending outward from each jaw member.

* * * * *